A. C. KING & F. HAMER.
TRANSMISSION OF POWER FROM A PRIME MOVER TO A LOAD.
APPLICATION FILED DEC. 19, 1908.

945,398.

Patented Jan. 4, 1910.
4 SHEETS—SHEET 1.

A. C. KING & F. HAMER.
TRANSMISSION OF POWER FROM A PRIME MOVER TO A LOAD.
APPLICATION FILED DEC. 19, 1908.

945,398.

Patented Jan. 4, 1910.
4 SHEETS—SHEET 2.

Witnesses

Inventors
Arthur Charles King
Frederick Hamer
By Townsend & Beck
Attorneys

A. C. KING & F. HAMER.
TRANSMISSION OF POWER FROM A PRIME MOVER TO A LOAD.
APPLICATION FILED DEC. 19, 1908.
945,398.
Patented Jan. 4, 1910.
4 SHEETS—SHEET 3.
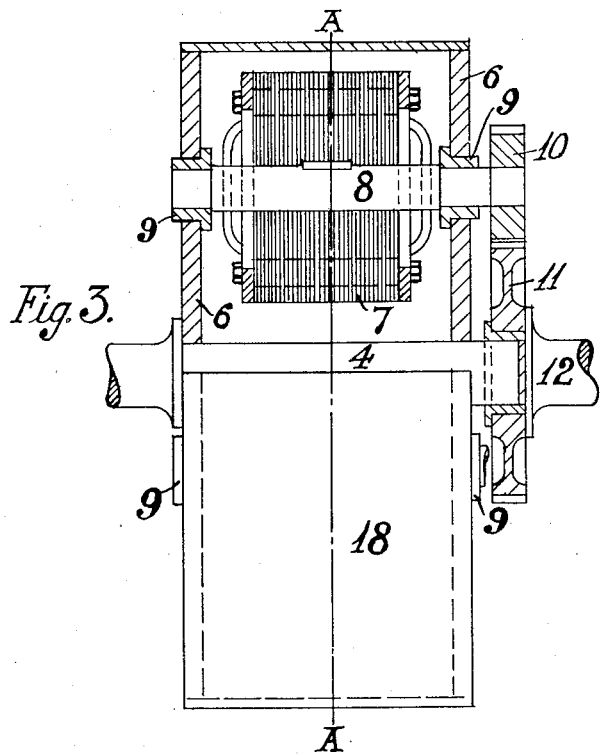
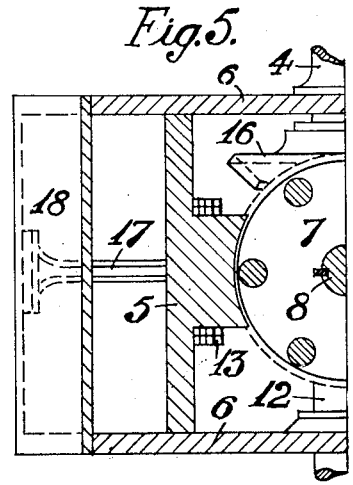
Witnesses
Inventors
Arthur Charles King
Frederick Hamer
By Townsend & Decker
Attorneys A. C. KING & F. HAMER.
TRANSMISSION OF POWER FROM A PRIME MOVER TO A LOAD.
APPLICATION FILED DEC. 19, 1908.

945,398.

Patented Jan. 4, 1910.
4 SHEETS—SHEET 4.

Witnesses

Inventors
Arthur Charles King
Frederick Hamer
By
Attorneys.

UNITED STATES PATENT OFFICE.

ARTHUR CHARLES KING, OF ISLINGTON, AND FREDERICK HAMER, OF HAYES, ENGLAND.

TRANSMISSION OF POWER FROM A PRIME MOVER TO A LOAD.

945,398.  Specification of Letters Patent.  Patented Jan. 4, 1910.

Application filed December 19, 1908. Serial No. 468,272.

*To all whom it may concern:*

Be it known that we, ARTHUR CHARLES KING and FREDERICK HAMER, subjects of the King of Great Britain and Ireland, residing at Sydney Grove, Sydney street, City Road, Islington, in the county of Middlesex, England, and Anchor Bridge House, Hayes, in the county of Middlesex, England, respectively, have invented new and useful Improvements in or Relating to the Transmission of Power from a Prime Mover to a Load, of which the following is a specification.

This invention relates to the transmission of power from a prime mover to a load, and, in particular, to power transmission systems or mechanisms in which the prime mover is connected with, or is geared to, the load through the intermediary of a combined clutch and variable speed gear device comprising a dynamo-electric element in which the armature is connected with, say, the load, and the field magnet structure is connected with, say, the prime mover, and both the armature and the field magnet structure rotate, variation in the drive or rate of motion being effected by alteration in the strength of the magnetic field and in the slip or lag of the armature.

Figure 1:
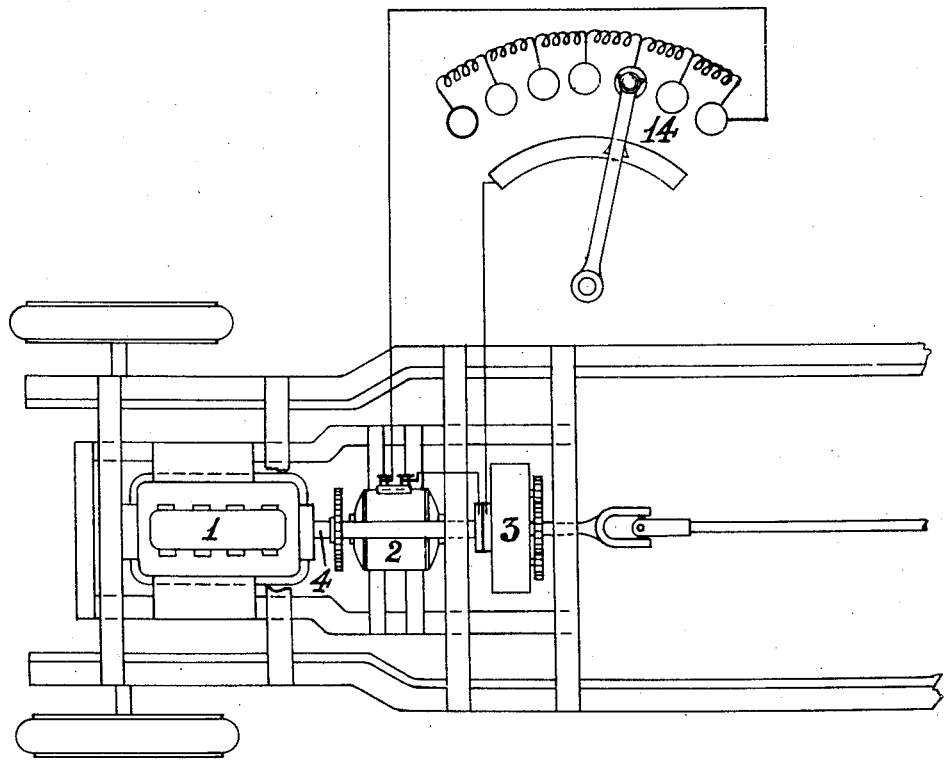

The invention will be particularly applicable for use in transmitting power from the motor on a motor propelled road vehicle to the road wheels and in connection with such a vehicle the combined clutch and variable speed gear device according to this invention is shown in Figure 1, 1 being the prime mover, 2 the exciter and 3 the combined clutch and variable speed gear device. The prime mover is shown in connection with a motor propelled road vehicle as an internal combustion engine, but it will be obvious that when the invention is used in other connections that the prime mover may be of a different type.

Figure 2:
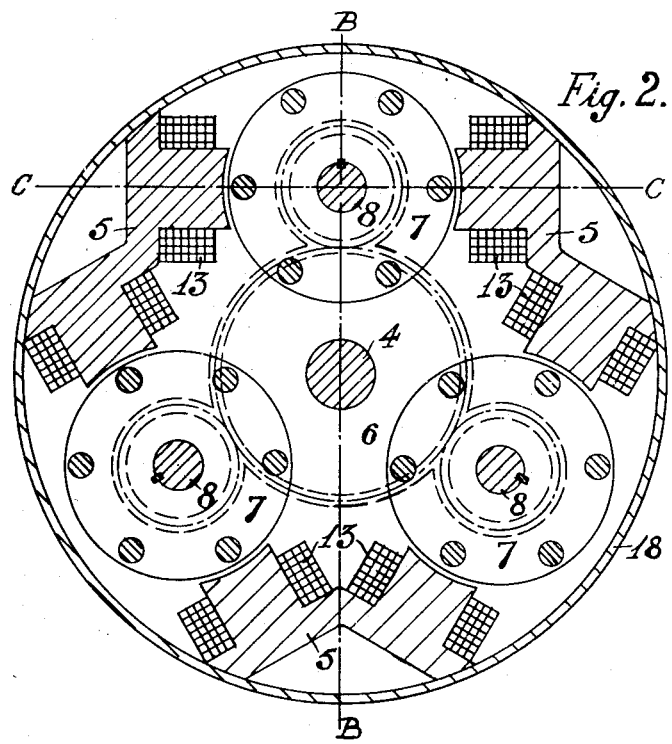
Figure 4:
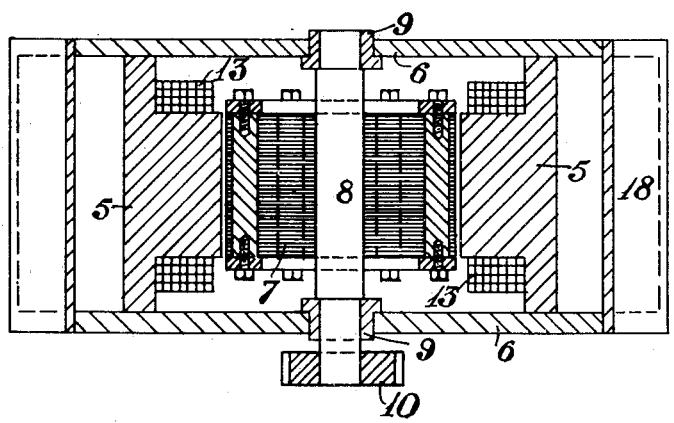
Figure 6:
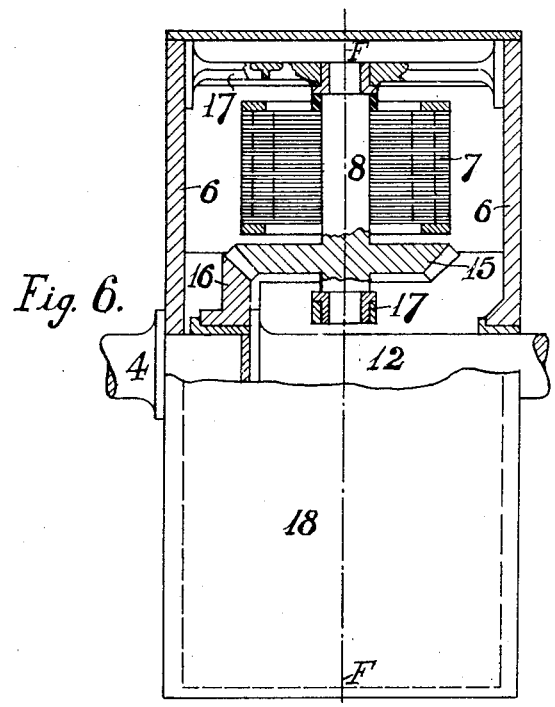
Figure 7:
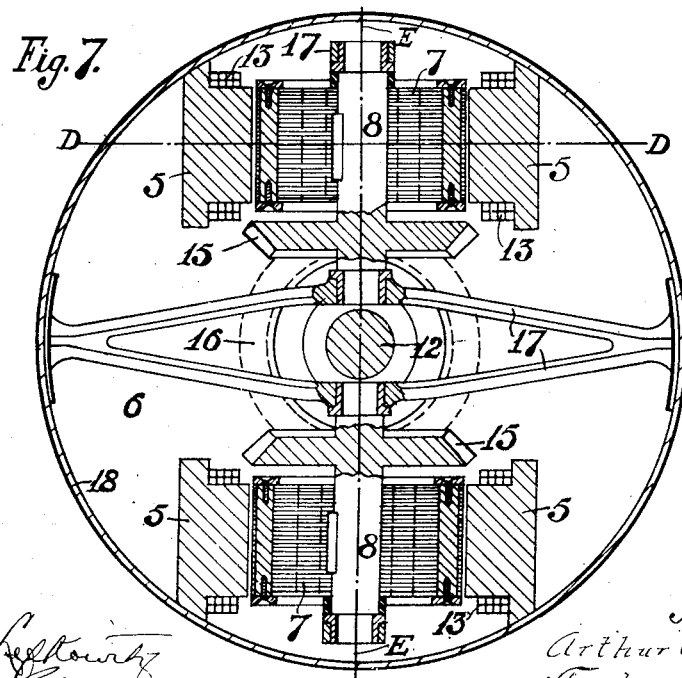

In the accompanying drawings, which are purely diagrammatic and illustrative, Fig. 2 is a section on the line A—A of Fig. 3; Fig. 3 is a section on the line B—B of Fig. 2; and Fig. 4 is a section on the line C—C of Fig. 2 of one construction of combined clutch and variable speed gear device in accordance with this invention. Fig. 5 is a section on the line D. D. of Fig. 7, Fig. 6 is a section on the line E E of Fig. 7, Fig. 7 is a section on the line F F of Fig. 6 of a modified arrangement.

In the construction illustrated, the field magnet structure is connected directly with the main or driving shaft 4 of the prime mover 1, but the field magnet structure may be connected therewith indirectly, as through gearing. The field magnet structure is of compound formation, that is to say, it has a plurality of pairs of field magnets or poles 5, but these field magnets or poles, instead of being spaced apart in a circle so as to act upon a single armature mounted to rotate within the space so inclosed, as in ordinary multipolar dynamo-electric machines, are arranged in suchwise that each pair of field magnets or poles acts upon an armature.

In Fig. 2, three pairs of field magnets or poles are shown, also three armatures 7; the arrangement as a whole may be considered as three separate two-pole dynamo-electric machines. The several pairs of field magnets or poles 5 are carried by a carrier 6, which comprises two disks immovably secured upon the shaft 4 and spaced apart, the several pairs of field magnets or poles being mounted between the two disks and disposed and arranged about the shaft 4 as clearly shown in Fig. 2. When the prime mover 1 is started up, the shaft 4 will be rotated and with it the carrier 6 and the field magnets or poles carried thereby. As before stated, each pair of field magnets or poles acts upon an armature 7 and each pair of field magnets or poles with their armature may be regarded as a separate unit or two-pole dynamo-electric machine.

In the arrangement illustrated in Figs. 2 to 4, the field magnets or poles have been shown arranged in such wise that the spindles 8 of the armatures must be placed parallel with the shaft 4. The spindles 8 are therefore mounted at their ends in bearings 9 formed in the disk 6. When, therefore, the carrier 6 rotates with the shaft 4 the armatures will be carried around therewith. Each armature spindle 8 is made of such length that one end projects through and beyond its bearing 9 in the disk 6. This projecting end of the armature spindle is provided with a spur wheel 10. The three spur wheels 10 gear with a central or sun wheel 11 mounted on the end of the shaft 12 to be driven, the shaft 12 being co-axial with the shaft 4. The arrangement as a whole forms an epicyclic or sun and planet gear train, but, instead of the usual mechanical braking carried out by, say, an externally or internally toothed gear wheel, wholly or partially retarded, the braking is effected electrically as will now be described. When the prime mover 1 is started up, the carrier 6 and the several pairs of field magnets or poles 5 will be rotated with and by the shaft 4; at the same time, the armatures 7 will also be carried around with and by the carrier 6. The armatures 7 will, in addition to the rotary motion just mentioned, have a rotary motion about their own axes and this latter motion will be caused by the spur wheels 10 gearing with and rolling idly over the sun spur wheel 11 on the end of the driven shaft 12.

When it is desired to transmit power from the prime mover 1 to the driven shaft 12 and to overcome its resistance to motion due to a load, the field magnets or poles are energized and the armatures 7 consequently each rotate in a magnetic field. The current required to energize the field magnets or poles may be obtained from a source of power, such as a secondary battery, or from an exciter, such as 2. In the arrangement illustrated in Fig. 1, the exciter 2 is slung from the chassis of the vehicle and its armature is driven from the shaft 4 through gearing. Current generated is led to terminals connected through slip rings and brushes with the windings 13 on the field magnets or poles 5. The intensity of the current so supplied is regulated by a resistance device 14. The windings of the field magnets or poles 5 are preferably all connected in series. When the armatures 7, which are preferably provided with short circuited windings as in ordinary induction motors, are rotated in the magnetic fields so set up, each armature will exert a torque, which will depend upon the strength of the magnetic field, on the armature reactions and on the amount of resistance to motion of the driven shaft 12. The torque so set up will cause each spur wheel 10 to set up a driving couple or to bind with the sun wheel 11, and thereby transmit power from the prime mover to the load. By varying the strengths of the magnetic fields the torque will be varied, and consequently the power transmitted from each spur wheel 10 through the sun wheel 11 to the shaft 12 will be readily controllable. Conversely, by maintaining the strength of the magnetic fields at a constant value, any variation in the load, such as would frequently occur in motor propelled road vehicles, by increasing or diminishing the resistance to motion of the shaft 12, will automatically vary the amount of driving torque transmitted through the spur wheels 10 to the sun wheel 11. In this modified arrangement shown in Figs. 5, 6 and 7, the armatures 7, instead of driving through spur wheels 10 and 11 the shaft 12, are caused to drive through bevel wheels 15 and 16, each armature spindle carrying a bevel wheel 15 which gears with the bevel wheel 16 on the end of the shaft 12. With this arrangement, the armature spindles are not arranged parallel with the shaft 4 but at right angles thereto and are mounted at their ends in brackets 17 secured to the carrier 6. In both arrangements, the space between the disks 6 is inclosed by a cover or casing 18. The combined clutch and variable speed gear device will therefore have the outward appearance of a flywheel which, in practice, it forms.

It will be understood that our invention is not limited to the specific arrangement and manner of controlling the field magnets but various modifications thereof might be employed without departing from the spirit of our invention.

What we claim is:—

1. In an apparatus of the class described, the combination with a driving motor, of a shaft to be driven, dynamo electric machines having one structure thereof driven by said motor and the other structure connected with said driven shaft through a gear train normally inoperative and means adapted to energize said latter named structure to cause said gear train to rotate said driven shaft.

2. In an apparatus of the class described, the combination with a motor driven shaft, of a shaft normally free from said motor, dynamo electric machines having one structure thereof driven by said motor driven shaft and the other structure connected with said free shaft through a gear train, means adapted to energize said first named structure to cause said gear train to rotate said free shaft and means adapted to vary the torque of the dynamo structure geared to said free shaft whereby the power transmitted thereto may be varied.

3. In an apparatus of the class described, the combination with a motor and its shaft, of a shaft to be driven, a plurality of two pole dynamo electric machines mounted about said motor shaft, the armatures of said machines being geared to said shaft to be driven and means for varying the torque exerted by said armatures and the power transmitted to said shaft to be driven.

4. In an apparatus of the class described, the combination with a motor and its shaft, of a shaft to be driven, a plurality of dynamo field structures connected to said motor shaft and adapted to rotate therewith, armatures for said field structures geared to said shaft to be driven and means for varying the torque exerted by said armatures and the power transmitted to said shaft to be driven.

5. In an apparatus of the class described, the combination with a motor and its shaft, of a shaft to be driven, a plurality of dynamo field structures concentrically arranged about said motor shaft and adapted to rotate therewith, armatures for said field structures, spindles upon which said armatures are mounted, sun and planet gearing adapted to connect said armature spindles with said shaft to be driven and means for varying the torque exerted by said armatures and the power transmitted to said shaft to be driven.

6. In an apparatus of the class described, the combination with a motor and its shaft, of a shaft to be driven, a plurality of concentrically arranged dynamo field structures adapted to rotate with said motor shaft, armatures for said field structures, spindles on which said armatures are mounted, sun and planet gearing connecting said armature spindles with said shaft to be driven, a generator connected with said motor shaft and adapted to energize said field structures and current controlling means adapted to control the energization of said field structures whereby the power transmitted to said shaft to be driven may be varied.

Dated this 28th day of November, 1908.

ARTHUR CHARLES KING.
FREDERICK HAMER.

Witnesses:
H. D. JAMESON,
R. F. WILLIAMS.